United States Patent [19]

Kompelien

[11] 4,405,080

[45] Sep. 20, 1983

[54] ELECTRONIC TEMPERATURE CONTROL FROM A MECHANICAL TEMPERATURE RESPONSIVE MEANS

[75] Inventor: Arlon D. Kompelien, Richfield, Minn.

[73] Assignee: Honeywell, Inc., Minneapolis, Minn.

[21] Appl. No.: 440,689

[22] Filed: Nov. 12, 1982

[51] Int. Cl.³ .................... G05D 15/00; H01G 7/00
[52] U.S. Cl. .................... 236/78 D; 361/282; 374/205
[58] Field of Search .............. 236/1 R, 78 D, 101 D, 236/101 R; 374/205; 361/282, 300

[56] References Cited

U.S. PATENT DOCUMENTS

| | | | |
|---|---|---|---|
| 2,412,782 | 12/1946 | Palmer | 361/282 X |
| 2,447,816 | 8/1948 | Rieber | 374/205 X |
| 2,827,600 | 3/1958 | Mullikin | |
| 3,774,089 | 11/1973 | Lewis | |
| 3,869,619 | 3/1975 | Camillo | |
| 4,254,906 | 3/1981 | Hayes | |

Primary Examiner—William E. Wayner
Attorney, Agent, or Firm—Alfred N. Feldman

[57] ABSTRACT

By means of a moveable insulating member that has two electrically conductive areas that are separated by a nonconductive area it is possible to build a mechanically controlled electronic thermostat. The temperature sensing is accomplished by a temperature responsive means that moves generally parallel to the conductive area, and functions as a pair of differentially energized variable capacitors that drive an electronic circuit when any unbalance occurs. This unbalance is indicative of a disagreement of the set temperature with the control temperature.

12 Claims, 3 Drawing Figures

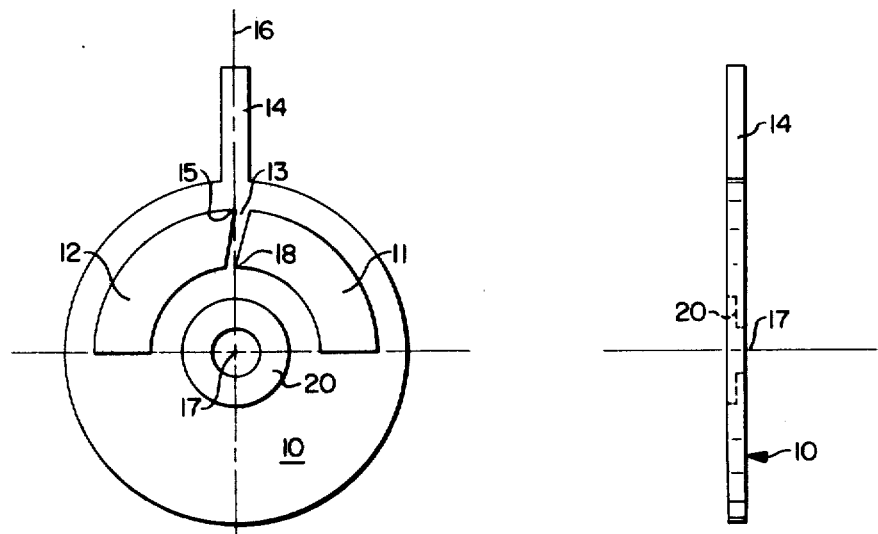
FIG. 1
FIG. 2
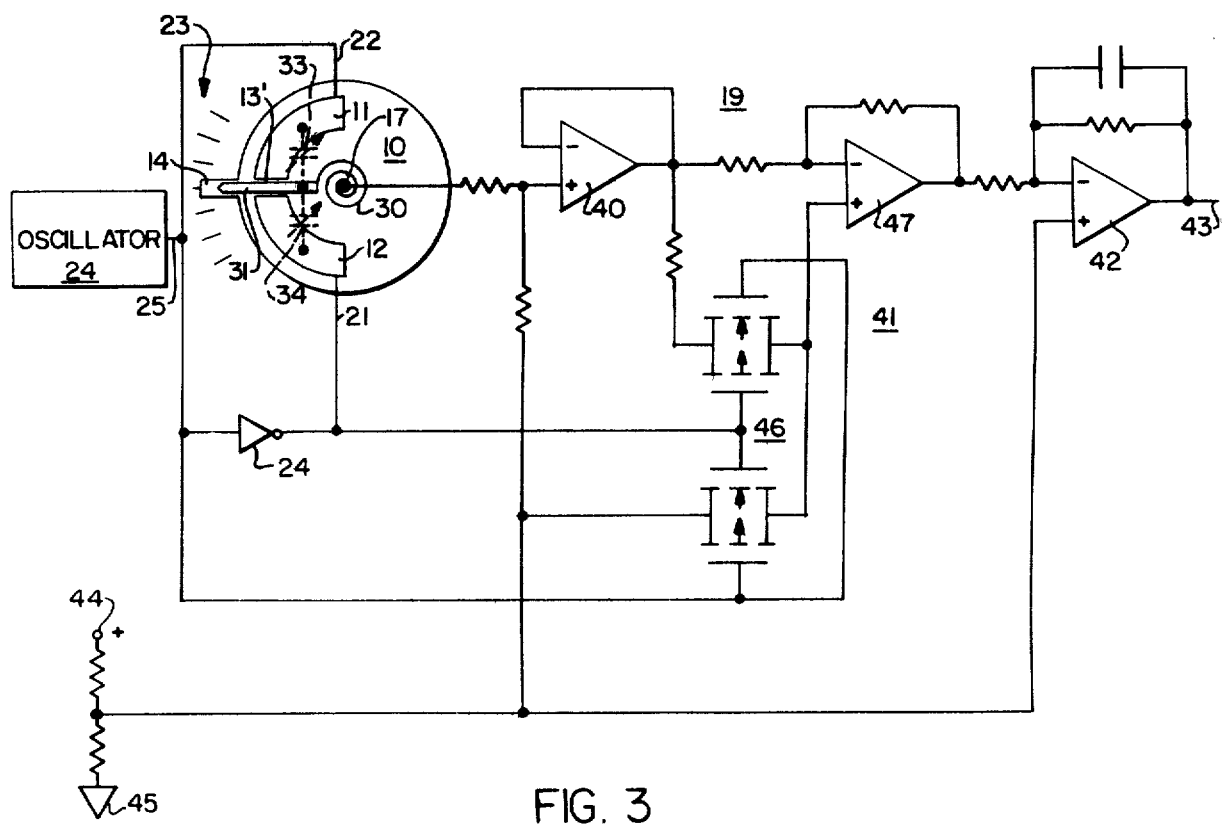
FIG. 3

ELECTRONIC TEMPERATURE CONTROL FROM A MECHANICAL TEMPERATURE RESPONSIVE MEANS

BACKGROUND OF THE INVENTION

In recent years electromechanical types of thermostats using a bimetal as a temperature sensor have been replaced by electronic thermostats. Electronic thermostats presently use a thermistor as a temperature sensor or input. This requires calibration by adjustment of resistors in a bridge circuit. The setpoint is normally provided for this type thermostat by adjusting a variable resistor by moving a mechanical wiper. There is serious concern that the variable resistor used for the setpoint remains stable. The wiping action over a long period of time could possibly change the resistance value and thereby the reliability of the calibration.

Also, the calibration of the thermostat must be sufficiently accurate so that no noticeable discrepancies occur between the control point temperature, and the normal bimetal temperature indicator that is usually used with this type of thermostat.

SUMMARY OF THE INVENTION

The present invention is to electronically sense the relative position of a mechanical temperature indicator, such as a bimetal, to control temperature; and at the same time sense the position of a setpoint indicator which utilizes the same temperature indicia or temperature scale. The bimetal is provided to sense the temperature and rotates generally parallel to a disc like insulating member that has two separate conductive areas placed at a fixed radius thereon. The conductive areas are separated by a small nonconductive area that corresponds with a lever or pointer that can be used to rotate the member so as to adjust the device for a particular temperature setting. The lever or pointer cooperates with a scale or indicia means, as does the bimetal used for sensing the temperature.

An oscillator is provided that has an output alternating current voltage that is directly connected to one of the conductive areas, and is connected through a NOT gate to invert the voltage by 180 degrees to the second conductive. This way the two conductive surfaces are driven by voltages that are 180 degrees out of phase. The conductive areas and the bimetal pointer form two capacitors with the bimetal indicator that are differentially arranged. The outputs of the capacitors are connected to a phase discrimination circuit to indicate whether the bimetal indicator is above or below the point set as sensed by the relative position of the rotating member. The output voltage of the phase discriminator then can be used, after proper amplification, to control a conventional heating or cooling system.

With the arrangement described, the same indicia is used for setting the temperature and must coincide with the temperature indicated when the system is in balance. Further, no mechanical wear occurs between the bimetal (or the mechanical temperature sensing means) and the conductive surfaces so that no wear occurs to cause a change in calibration with time.

BRIEF DESCRIPTION OF THE DRAWINGS

FIG. 1 is a plain view of the rotatable insulating member;

FIG. 2 is a side view of FIG. 1, and;

FIG. 3 is a schematic drawing of the mechanical assembly and electronics of a mechanically controlled electronic thermostat.

DESCRIPTION OF THE PREFERRED EMBODIMENT

In FIG. 1 a moveable insulating means 10 is disclosed specifically as a rotatable insulating member. The rotatable member 10 can be manufactured from any type of insulating material, such as a plastic or a ceramic. The member would have two conductive plates or areas 11 and 12 placed as semicircles on the rotating insulating member 10, and these two conductive members 11 and 12 would be separated by a nonconductive area 13. The electrically conductive areas 11 and 12 could be plated onto the member 10 or could be individual conductive areas that are cemented or otherwise attached in place on the insulating means 10. The insulating means 10 further has a projection 14 that serves two different functions. The projection 14 will function as a temperature indicating means, and at the same time is a convenient handle or member for adjusting the moveable insulating means 10 in the embodiment disclosed in FIG. 3.

In FIG. 1, the nonconductive area 13 has been specifically shown as a sloped nonconductive area between the conductive elements 11 and 12. The slope of the slot 13 between the two conductive areas 11 and 12 can be adjusted according to the amount of proportional control desired for the present device.

In FIG. 2 there is a side view of the moveable insulating means 10 showing the center of rotation 17 and the temperature indicating or lever means 14. A recessed portion 20 is disclosed which provides a friction bearing support to a bimetal assembly which will be disclosed in FIG. 3 and is mounted in the overall device.

In FIG. 3 a sensing and signal conditioning circuit of a mechanically controlled electronic thermostat 19 is disclosed. The moveable insulating means or rotatable insulating member 10 is again disclosed with the conductive areas 11 and 12 shown connected to a pair of conductors 21 and 22. The conductors 21 and 22 could be flexible conductors or could be slide conductors to the conductive areas 11 and 12, but they are such as to allow the rotating insulating member 10 to rotate about the center 17 whenever the temperature setpoint indicating means 14 is manually adjusted with respect to an indicia generally disclosed at 23. The indicia 23 would be a temperature scale in either degrees Fahrenheit or degrees Centigrade depending on the design of the thermostat 19.

The conductors 21 and 22 are connected to an oscillator disclosed at 24. The oscillator 24 has an output conductor 25 that is common to the conductor 22, and is connected to the conductor 21 through a NOT gate 24 so that the voltage from the oscillator is inverted. With the arrangement disclosed the oscillator 24 is capable of supplying the conductive areas 11 and 12 with alternating current voltages of opposite polarity. The oscillator 24 typically would be part of the electronics or power supply contained within the thermostat 19 disclosed in FIG. 3.

Also supplied within the thermostat 19 is a bimetal disclosed at 30 having a spiral configuration, and a pointer portion, 31 that acts as a temperature responsive means that is physically able to move adjacent to and generally parallel to the conductive areas 11 and 12. It will be understood that as temperatures change, the bimetal 30, which is anchored at the center of rotation 17, allows the temperature responsive means or portion 31 to move up or down in a rotating manner depending on the temperature to which the thermostat is exposed. In the position disclosed, the temperature responsive means or indicator portion 31 is centered over the nonconductive area 13', which in this example is shown as a nonskewed slot. This is done for clarity sake. In a real device, the nonconductive area 13' would be slanted to provide the proportional band, as is disclosed in FIG. 1.

Two capacitors are disclosed in FIG. 3 at 33 and 34. The capacitor 33 is the capacitance between the temperature responsive means 31 and the conductive area 11. This is accomplished as an air dielectric type of capacitor where the temperature responsive means 31 is metallic and forms one plate of the capacitor. The conductor area 11 forms the second plate. The second variable capacitor disclosed is at 34 wherein the same conductive portion of the temperature responsive means 31 acts as a capacitor plate with an air dielectric to the second conductive area 12. As such two capacitors, 33 and 34 are provided that are differentially variable as the rotatable insulating means 10 is moved with respect to the bimetal 30.

It can be seen that by moving the indicating or adjusting means 14 it is possible to upset the even distribution of capacitance that is exemplified in FIG. 3. This same unbalance can occur whenever the bimetal 30 is activated by a temperature change which moves the temperature responsive means 31 with respect to the position shown. As such, it is clear that either a mechanical rotation of the moveable insulating means 10 or a temperature change at the thermostat can cause an unbalance of the two differentially variable capacitors 33 and 34.

The mechanically controlled electronic thermostat 19 of FIG. 3 is completed by an amplifying means generally disclosed at 40, and a demodulator and phase discriminator generally disclosed at 41. This phase demodulator circuit is only one of many that could be used. Shown at 46 are four metal oxide semiconductor transistors that provide a single pole, double throw switching action controlling the potential applied to the positive input of an amplifier 47. This switching action is controlled by the same oscillator driving the sensing capacitor members so the output of amplifier 47 becomes a direct current potential whose value is dependent on the unbalance of the capacitance values. This direct current signal of the phase discriminator is again amplified at 42 to provide an output signal from the electronic circuit means at output means 43 which is indicative of the degree of unbalance of the capacitors 33 and 34. The system is completed by a power source 44 that is grounded at 45. The power source 44 would be common in the electronic thermostat to the source or power supply means for the oscillator 24.

The present invention has been disclosed as being accomplished by a rotatable insulating member 10. It could also readily be accomplished by providing a moveable insulating means 10 that moved in a linear manner as opposed to a rotating manner. The moveable insulating means 10 could be rectangular in configuration, and the conductive areas 11 and 12 would be conventional rectangles separated by a nonconductive area 13. The movement of the insulating means 10 would be in a rectilinear manner. It would be possible to build such a structure utilizing a bimetal that had a linkage that provided a rectilinear motion for the temperature responsive means 31 of the pointer portion of the bimetal 30. All that is required of the present invention is that an insulating member be moveable and have two conductive areas that are separated by a nonconductive area. The invention could be accomplished by providing a temperature responsive means having a conductive portion that moved in a rectilinear manner, as could be provided from a bimetal and a lever or linkage type of motion. Once again, the conductive areas would be driven electrically by an alternating current source having opposite polarity output voltages.

In the present invention, by proper mechanical construction, the setpoint lever 14 and the bimetal indicator 31 can utilize the same temperature scale or indicia 23. With this approach to the design no problem of tracking of the setpoint and the temperature indicator are present. Also, with the use of a capacitive coupling there is no mechanical wiping action required that could subject the thermostat to a mechanical failure or a change in calibration. It is noted that once the calibration of the bimetal indicator is provided, the calibration for the temperature control is complete. Due to the nature of the electronics in the present device, it is capable of low cost integration and therein a mechanically controlled electronic thermostat of very simple and inexpensive design has been provided for. Since the design can be altered in many ways, such as from a rotating structure to a linear structure, the applicant wishes to be limited in the scope of his invention solely by the scope of the appended claims.

The embodiments of the invention in which an exclusive property or right is claimed are defined as follows:

1. A mechanically controlled electronic thermostat, including: a rotatable insulating member having two electrically conductive areas on said rotatable member with said two areas electrically separated from each other by a nonconductive area; electric power supply means including an alternating current source having opposite polarity output voltages; a first of said areas electrically connected to a first of said voltages and a second of said areas electrically connected to a second of said voltages; temperature indicia means adjacent said rotatable insulating member with said member further having temperature indicating means to provide for the selection of a control temperature for said thermostat by said rotatable member being rotated and said temperature indicating means cooperating with said temperature indicia means; temperature responsive means mounted adjacent said rotatable member and having a rotatable conductive portion that rotates adjacent to said two conductive areas; said conductive areas and said conductive portion of said temperature responsive means creating two differentially variable capacitors; electronic circuit means including connection means connected to said two variable capacitors with said circuit means measuring the unbalance of said capacitors by measuring a capacitive coupled voltage from said alternating current source; and said electronic circuit means having output means indicative of the unbalance of said capacitors.

2. A mechanically controlled electronic thermostat as described in claim 1 wherein said temperature responsive means includes a bimetal having a conductive portion; and said conductive portion of said bimetal rotates adjacent to and generally parallel to said two conductive areas.

3. A mechanically controlled electronic thermostat as described in claim 2 wherein said nonconductive area of said rotatable insulating member is defined by the separation of said two electrically conductive areas; and said nonconductive area having a slope with respect to a radius of rotation of said rotatable member to define a proportional control band for said thermostat.

4. A mechanically controlled electronic thermostat as described in claim 3 wherein said temperature indicating means includes an adjustment lever for setting a temperature control point for said thermostat, and said lever simultaneously cooperating with said temperature indica means to indicate the setpoint of said thermostat; and said bimetal cooperating with said indicia means to indicate the temperature of the air at said thermostat.

5. A mechanically controlled electronic thermostat as described in claim 1 wherein said alternating current source has opposite polarity output voltages and includes an oscillator having two output conductors; a first of said conductors connected to said first of said conductive areas; and a second of said conductors connected to voltage inverter means which in turn is connected to said second of said conductive areas.

6. A mechanically controlled electronic thermostat as described in claim 5 wherein said alternating current source and said oscillator are part of a power supply for said electronic thermostat.

7. A mechanically controlled electronic thermostat, including: moveable insulating means having two electrically conductive areas on said moveable means with said two areas electrically separated from each other by a nonconductive area; electric power supply means including an alternating current source having opposite polarity output voltages; a first of said areas electrically connected to a first of said voltages and a second of said areas electrically connected to a second of said voltages; temperature indicia means adjacent said moveable insulating means with said insulating means further having temperature indicating means to provide for the selection of a control temperature for said thermostat by said moveable insulating means being moved and said temperature indicating means cooperating with said temperature indicia means; temperature responsive means mounted adjacent said moveable insulating means and having a moveable conductive portion that moves adjacent to said two conductive areas; said conductive areas and said conductive portion of said temperature responsive means creating two differentially variable capacitors; electronic circuit means including connection means connected to said two variable capacitors with said circuit means measuring the unbalance of said capacitors by measuring a capacitive coupled voltage from said alternating current source; and said electronic circuit means having output means indicative of the unbalance of said capacitors.

8. A mechanically controlled electronic thermostat as described in claim 7 wherein said temperature responsive means includes a bimetal having a conductive portion; and said conductive portion of said bimetal moves adjacent to and generally parallel to said two conductive areas.

9. A mechanically controlled electronic thermostat as described in claim 8 wherein said nonconductive area of said moveable insulating means is defined by the separation of said two electrically conductive areas; and said nonconductive area having a slope with respect to a line perpendicular to the direction of movement of said moveable insulating means to define a proportional control band for said thermostat.

10. A mechanically controlled electronic thermostat as described in claim 9 wherein said temperature indicating means includes an adjustment lever for setting a temperature control point for said thermostat and said lever simultaneously cooperating with said temperature indicia means to indicate the setpoint of said thermostat; and said bimetal cooperating with said indicia means to indicate the temperature of the air at said thermostat.

11. A mechanically controlled electronic thermostat as described in claim 7 wherein said alternating current source has opposite polarity output voltages and includes an oscillator having two output conductors; a first of said conductor connected to said first of said conductive areas; and a second of said conductors connected to voltage inverter means which in turn is connected to the second of said conductive areas.

12. A mechanically controlled electronic thermostat as described in claim 11 wherein said alternating current source and said oscillator are part of a power supply for said electronic thermostat.

* * * * *